(12) United States Patent
Zahariev

(10) Patent No.: US 8,031,195 B2
(45) Date of Patent: Oct. 4, 2011

(54) SYSTEM AND METHOD OF PROVIDING INTERACTIVE DATA ANALYSIS WITH VARYING SUBJECTIVE PARAMETERS

(75) Inventor: Manuel Zahariev, Garibaldi Highlands (CA)

(73) Assignee: Vision Critical, Inc., Vancouver, B.C. (CA)

( * ) Notice: Subject to any disclaimer, the term of this patent is extended or adjusted under 35 U.S.C. 154(b) by 677 days.

(21) Appl. No.: 12/102,652

(22) Filed: Apr. 14, 2008

(65) Prior Publication Data

US 2009/0256846 A1    Oct. 15, 2009

(51) Int. Cl.
*G06T 11/20* (2006.01)
*G09G 5/22* (2006.01)

(52) U.S. Cl. .................................. 345/440; 345/440.2

(58) Field of Classification Search .................. 345/440, 345/440.2
See application file for complete search history.

(56) References Cited

U.S. PATENT DOCUMENTS

| | | | |
|---|---|---|---|
| 5,835,085 A * | 11/1998 | Eick et al. | 345/440 |
| 6,842,176 B2 * | 1/2005 | Sang'udi et al. | 345/440 |
| 7,006,688 B2 * | 2/2006 | Zaklika et al. | 382/165 |
| 2006/0028470 A1 * | 2/2006 | Bennett et al. | 345/440 |
| 2010/0039432 A1 * | 2/2010 | Buck | 345/440.2 |

* cited by examiner

*Primary Examiner* — Chante Harrison
(74) *Attorney, Agent, or Firm* — Knobbe Martens Olson & Bear LLP

(57) ABSTRACT

An interactive data analysis system is disclosed. The interactive data analysis system has a computer-generated user interface which includes a plurality of histogram elements having data band controls. The data band controls allow modification of subjective parameters related to the data analysis and produce realtime updates to data forms which present the analyzed data to the user.

19 Claims, 9 Drawing Sheets

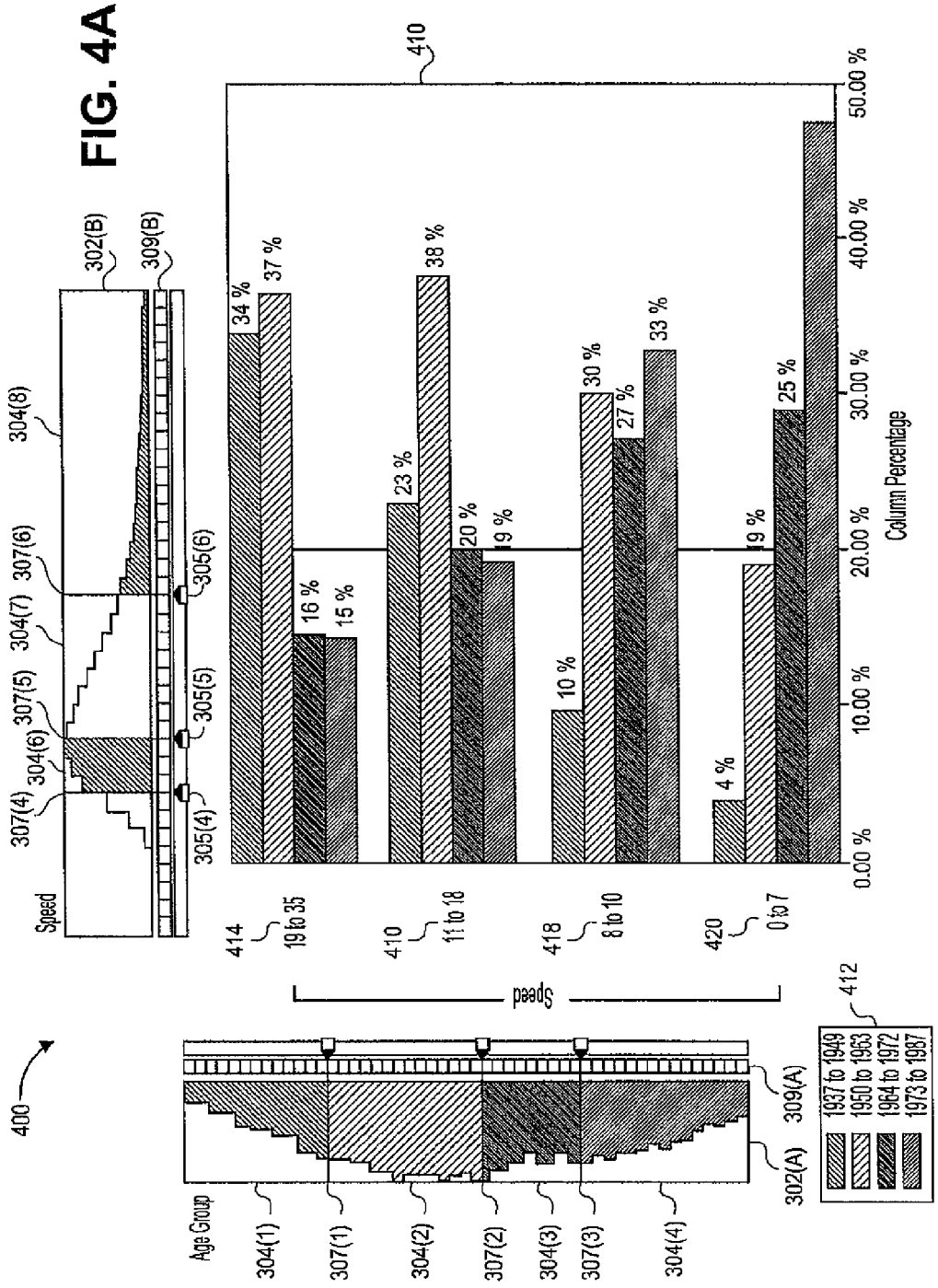

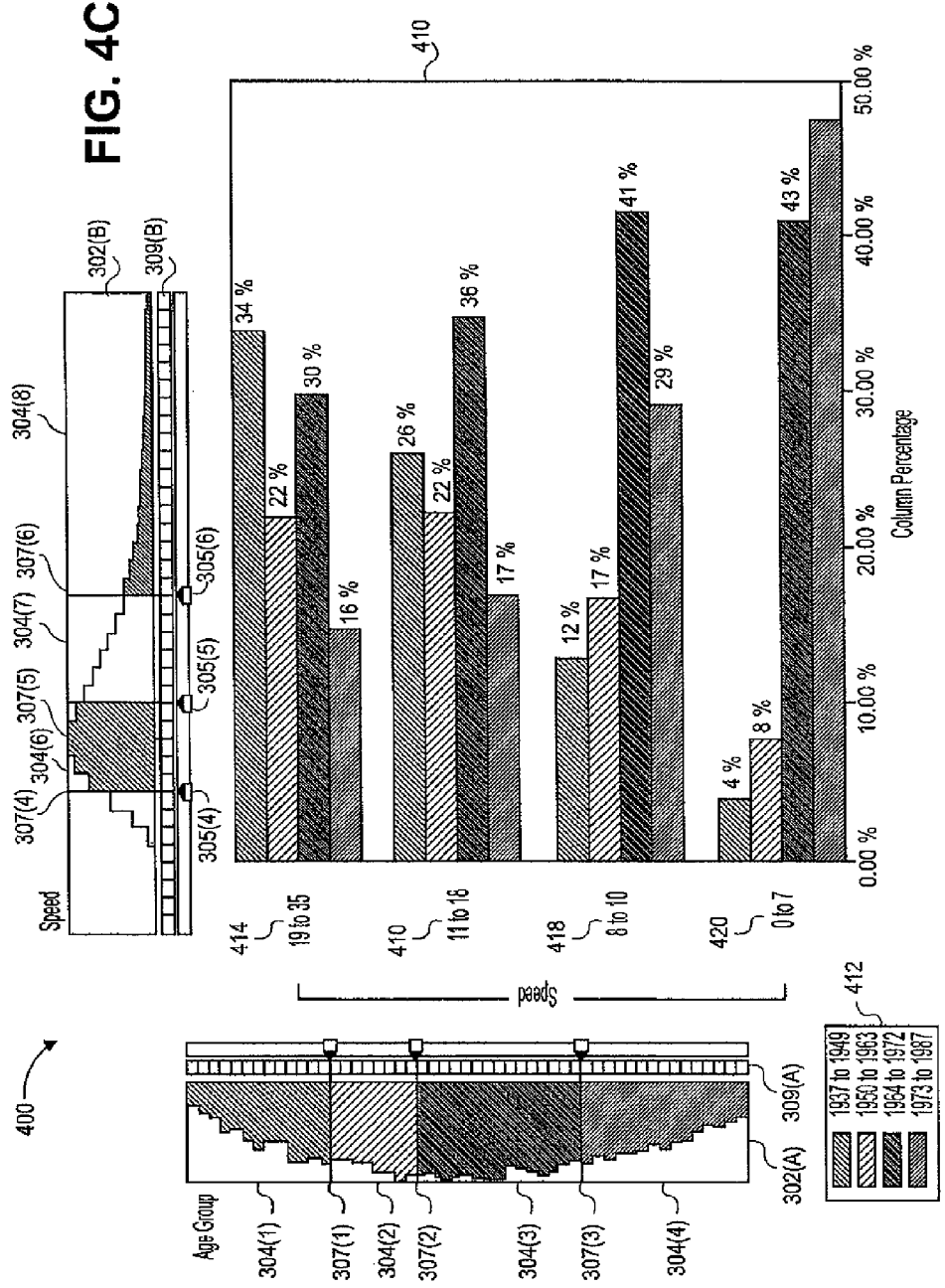

SYSTEM AND METHOD OF PROVIDING INTERACTIVE DATA ANALYSIS WITH VARYING SUBJECTIVE PARAMETERS

BACKGROUND OF THE INVENTION

1. Technical Field

This disclosure relates to interactive data analysis. More particularly, this disclosure relates to systems and methods of providing interactive visual representations of data based on variances in subjective parameters.

2. Description of the Related Technology

The scientific method of investigation relies on testing hypotheses through experimental or observational study. Hypotheses are typically formed as mathematical models and a systematic study is conducted in order to validate or disprove the model.

Experimental and observational studies typically include multiple phases. One phase may be a data collection phase, during which quantifiable measures of a predefined set of parameters are obtained by the party conducting the study. In many cases, hypotheses are predefined, that is, they are defined prior to the data collection phase in order to avoid conscious or unconscious bias to the hypothesis from data collected. Certain protocols may be employed in order prevent bias from creeping into the data collection. These protocols typically include utilizing a blind setup in which subjects are not aware of the hypothesis or the conditions being tested, or possibly a double-blind setup in which neither the subjects nor experimenters/data collectors are aware of the hypothesis or the conditions being tested.

After data collection, a data analysis phase then utilizes the collected data in order to prove or disprove the proposed hypothesis. The data analysis phase typically relies on the use of accepted mathematical and statistical calculations which compare the data collected to models representing the hypotheses being evaluated or tested. The data analysis process typically relies on algorithmic computation of collected data and on visualization of dependencies between the experimental and/or observed variables.

During a typical data analysis phase, a number of objective criteria can influence the results of the calculations. An objective parameter is typically a fundamental or methodological attribute of the data collection or analysis, whose value would not be normally called into question by other researchers. Examples of objective criteria that may be considered include assumption of normality and the principle of least effort. In addition to the objective parameters, a number of subjective criteria or parameters are also chosen for evaluation. A subjective parameter is typically an attribute of the data analysis which is chosen ad-hoc by the researcher, where another researcher may choose a different value. One example of a subjective parameter that is commonly used to test hypotheses is the P-value, which is the probability of obtaining a result at least as extreme as a given data point, under the null hypothesis. Another example of a subjective parameter is the choice of algorithm applied to data (e.g., choosing to use maximum parsimony or maximum likelihood in deriving a phylogeny). Other examples of subjective parameters may include a choice of age group boundaries in an age study (e.g., ages 18-25, 26-40 versus ages 18-30, 31-40), or the size of an interval (e.g., one year interval, five year interval, etc.).

Ideally, subjective parameters are formulated as part of the hypothesis (or as part of the mathematical model associated with the hypothesis) prior to commencement of the data collection phase. For example, a P-value should be chosen before data collection and analysis so that the collection and analysis leads to a clear answer as to whether the hypothesis holds.

In reality, subjective parameters are commonly identified during the data collection and analysis processes. Moreover, subjective parameter values are often modified and manipulated several times during the data analysis process, leading to an iterative data analysis process through which conclusions are drawn. Existing data analysis systems and methods do not adequately account for the iterative nature of testing hypotheses in data analysis.

SUMMARY OF CERTAIN INVENTIVE ASPECTS

An interactive data analysis system is disclosed. The interactive data analysis system has a computer-generated user interface which includes a plurality of histogram elements having data band controls. The data band controls allow modification of subjective parameters related to the data analysis and produce realtime updates to data forms which present the analyzed data to the user.

In a first embodiment, an interactive data analysis system having a computer-generated user interface is provided. The user interface includes a first histogram element related to a first subjective parameter of data. The first histogram element has a plurality of data band controls configured to control adjustment of data bands presented in the first histogram element. The user interface also includes a second histogram element related to a second subjective parameter of data. The second histogram element has a plurality of data band controls configured to control adjustment of data bands presented in the second histogram element. A dynamic data form element updates in real-time based on changes in the data band controls.

In a second embodiment, a computer-implemented method of providing an interactive data analysis interface on a display associated with a computing device is provided. The method includes displaying a first histogram element, a second histogram element, and a data form in a user interface, wherein the data form comprises a visual display element indicative of a distribution of data across one or more subjective parameters. The first histogram element is associated with a first subjective parameter and the second histogram element is associated with a second subjective parameter. The method further includes receiving a user input with respect to at least one of the first and second histogram elements and in response to the input, modifying at least one of the first subjective parameter and second subjective parameter. The modified subjective parameter is transmitted to a statistical analysis module for generation of a new data form, and the new data form is displayed in the user interface.

BRIEF DESCRIPTION OF THE DRAWINGS

FIG. 4A is an example of bar chart data form with interactive numeric banding according to an embodiment.

FIG. 4C is an example of the bar chart data form from FIG. 4B after modification of a second subjective data parameter.

DETAILED DESCRIPTION OF CERTAIN EMBODIMENTS

Certain embodiments disclosed herein provide systems and methods which allow users to specify changes in subjective data parameters during and/or throughout a data analysis process, and thereby quickly and easily test additional hypotheses without requiring additional collection of data. A graphical user interface environment is provided to a user in which results of data analysis are presented in generally accepted data representations resulting from the mathematical and/or statistical manipulation of data collected and input into the system. The generally accepted data representations include data forms which provide visual representations of the data collected. In some embodiments, variables are coded as bands over the numeric integer values, with band cutoff points representing subjective parameters for the data analysis. The band cutoff points may be displayed to the user as slider controls which allow the user to easily and quickly manipulate the subjective parameters to specify cut-point locations, and to immediately see the effect on analysis and statistics to allow for quick and easy testing of 'what-if' scenarios without requiring an off-line analysis step.

Figure 1:
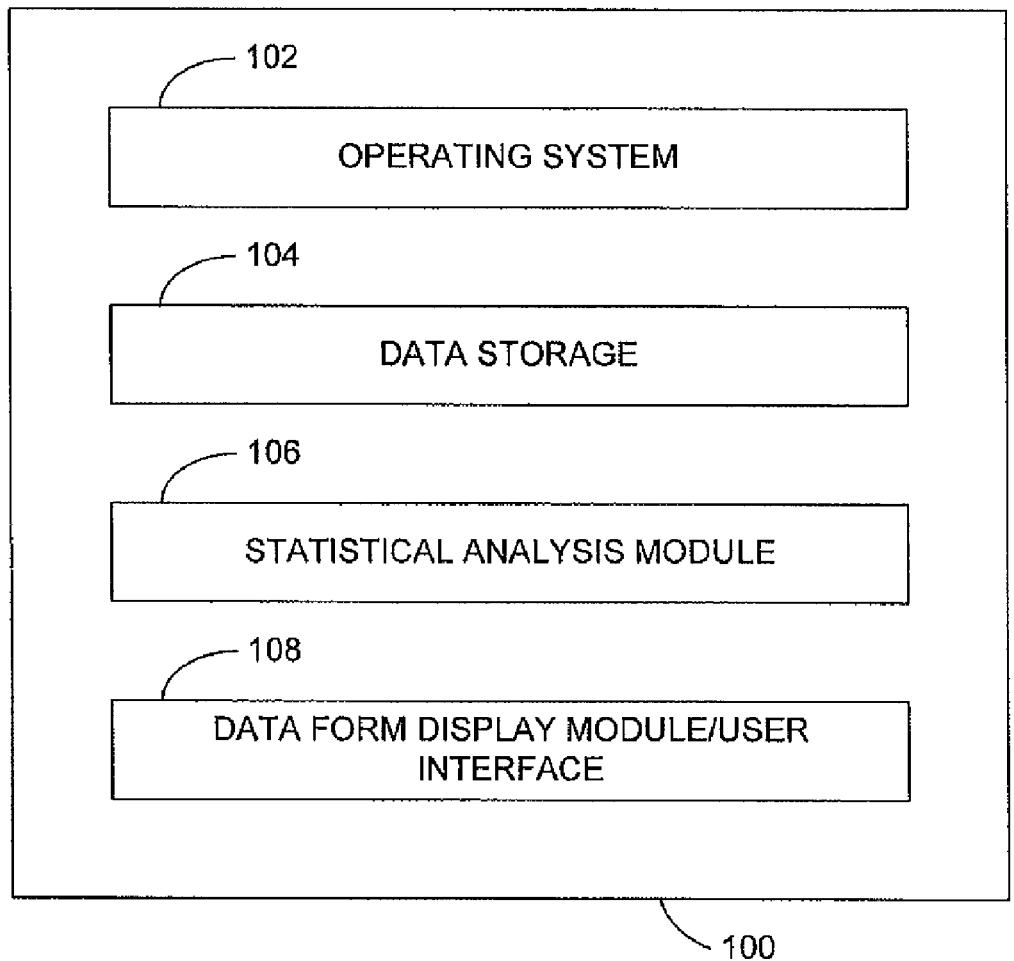
FIG. 1 is a block diagram of a computing device suitable for implementation of an interactive data analysis system according to one or more embodiments disclosed herein.

FIG. 1 is a block diagram illustrating certain modules of a computing device or system 100 suitable for the implementation of various embodiments disclosed herein. The computing device or system 100 may be a general purpose computer such as a desktop or laptop computer, or it may be a specialized computing device which is specifically configured to perform data analysis routines. The computing device 100 may also be a handheld computer, a SmartPhone, a server, a distributed system having multiple distinct computers or nodes, or some other type of device. The computing device 100 may include an operating system 102. The operating system 102 may be a general purpose operating system such as, for example, Windows, MacOS, Linux, or Unix.

The computing device 100 may further include data storage 104. The data storage 104 may take various forms. In some embodiments, the take storage may take the form of non-volatile memory such as a hard disk drive, a flash memory, or some other type of non-volatile memory. Portions of the operating system 102 may be stored in the data storage 104. The data storage 104 may also include volatile memory such as a form of random access memory (RAM, DRAM, SDRAM, DDRAM, etc.) or some other type of volatile memory. Also stored in the data storage 104 may be statistical data which is typically collected in order to be analyzed by statistical analysis software on the computing device. Accordingly, the computing device 100 may also include a statistical analysis module 106.

The statistical analysis module 106 may be a computer software application that performs predictive analysis based on data collections stored in the data storage 104. The statistical analysis module 106 may be a custom developed software application, or it may be an off the shelf statistical analysis software application such as SPSS, SAS, Excel, or some other software application known in the art. Results of analysis performed by the statistical analysis module 106 may be displayed in data forms. The computing device 100 may include a data form display module or user interface 108 which is configured to communicate with the statistical analysis module 106 to display the result of data analysis in data forms which are understandable by a researcher user. The data form display module 108 may be a portion of the statistical analysis module 106, or it may be a separate software application which is in communication with the statistical analysis module 106. In some embodiments, the data form display module 108 may be implemented as a web-based application which runs in a web browser environment and accesses the statistical analysis module 106 via a network connection over a local or wide area network. It is to be appreciated that the computing device provided in FIG. 1 is not intended to show all components in a computing device that may be used, but rather show certain components that may be related to the implementation of aspects of certain embodiments described herein.

Figure 2:
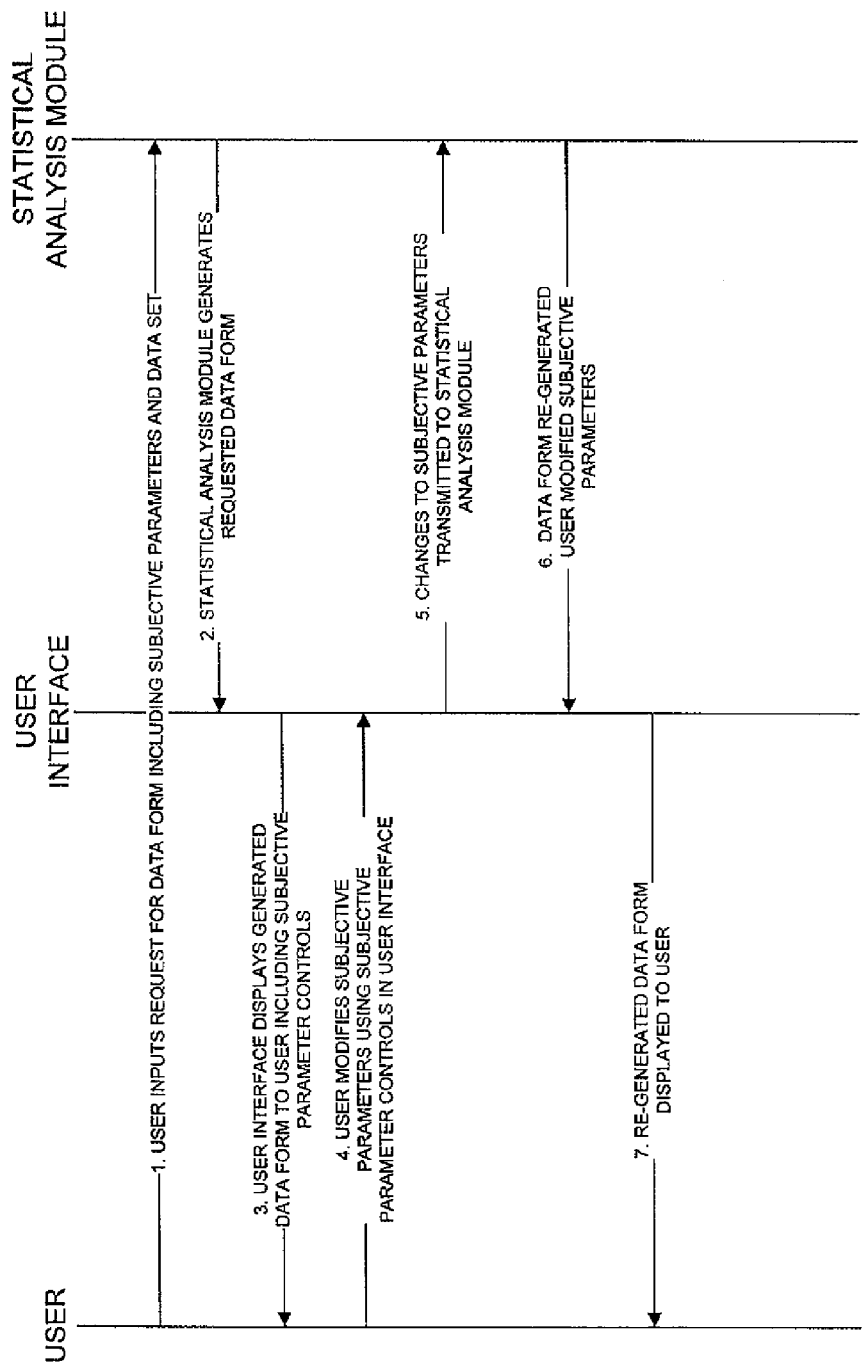
FIG. 2 is a block diagram illustrating data flow between software components of one embodiment of the computing device illustrated in FIG. 1.

Referring now to FIG. 2, a block diagram is provided which illustrates data flow between software components according to at least one embodiment. The software components may be provided on a computing device such as the computing device 100 illustrated in FIG. 1. As shown, in event 1, the user requests a data form from the statistical analysis module 106. This request may be made directly to the statistical analysis module 106, or it may be filtered through the data form display module 108. The user request may specify various parameters which are to be used by the statistical analysis module 106 to create the data form. For example, the request may specify the data set to be used. The request may further specify objective parameters to apply when performing the calculations to be used. These parameters may include assumptions of a linear model that fits the data, or of a normal distribution of the observations. The user request may also specify a set of subjective parameters which are to be applied to the data in generating the data form.

Upon receiving the request, the statistical analysis module 106 generates the requested data form at event 2. Once the data form has been generated by the statistical analysis module 106, at event 3, the data form is displayed on the user interface 108 of the computing device 100 so that the user may see the visual representation of the data. Also displayed to the user are one or more subjective parameter controls which allow the user to manipulate values of subjective parameters associated with the data analysis. The subjective parameter controls may be provided by the designer of the form, or they may be added by the user. The subjective parameter controls are discussed in additional detail below with reference to FIGS. 3 and 4.

Next, at event 4, the user modifies one or more of the subjective parameter controls. When the subjective parameter controls are modified by the user, a request is immediately sent to the statistical analysis module 106 to update the data form based on the modified subjective parameters at event 5. The statistical analysis module 106 receives the request for an updated data form, and it regenerates the data form at event 6 using the adjusted subjective parameters. Once the data form has been regenerated to include the new values associated with modified subjective parameters, at event 7, the new data form is displayed to the user. Each time the user modifies the subjective parameters using the subjective parameters controls, event numbers 4 through 7 are repeated in order to provide immediate modifications to the data form so that the user can quickly understand the implications of their changed parameters.

Figure 3A:
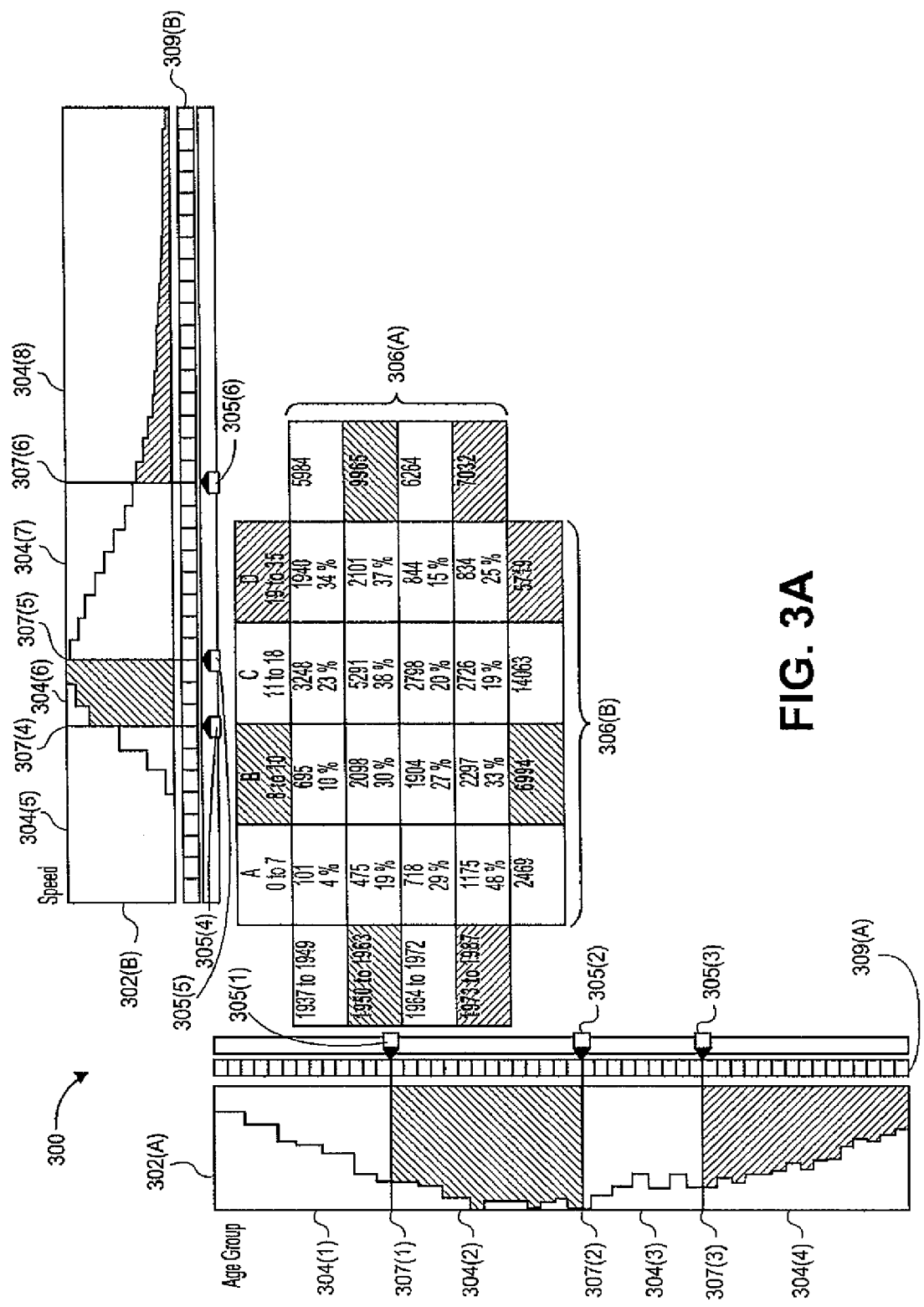
FIG. 3A is an example of crosstab data form with interactive numeric banding according to one or more embodiments.
Figure 3B:
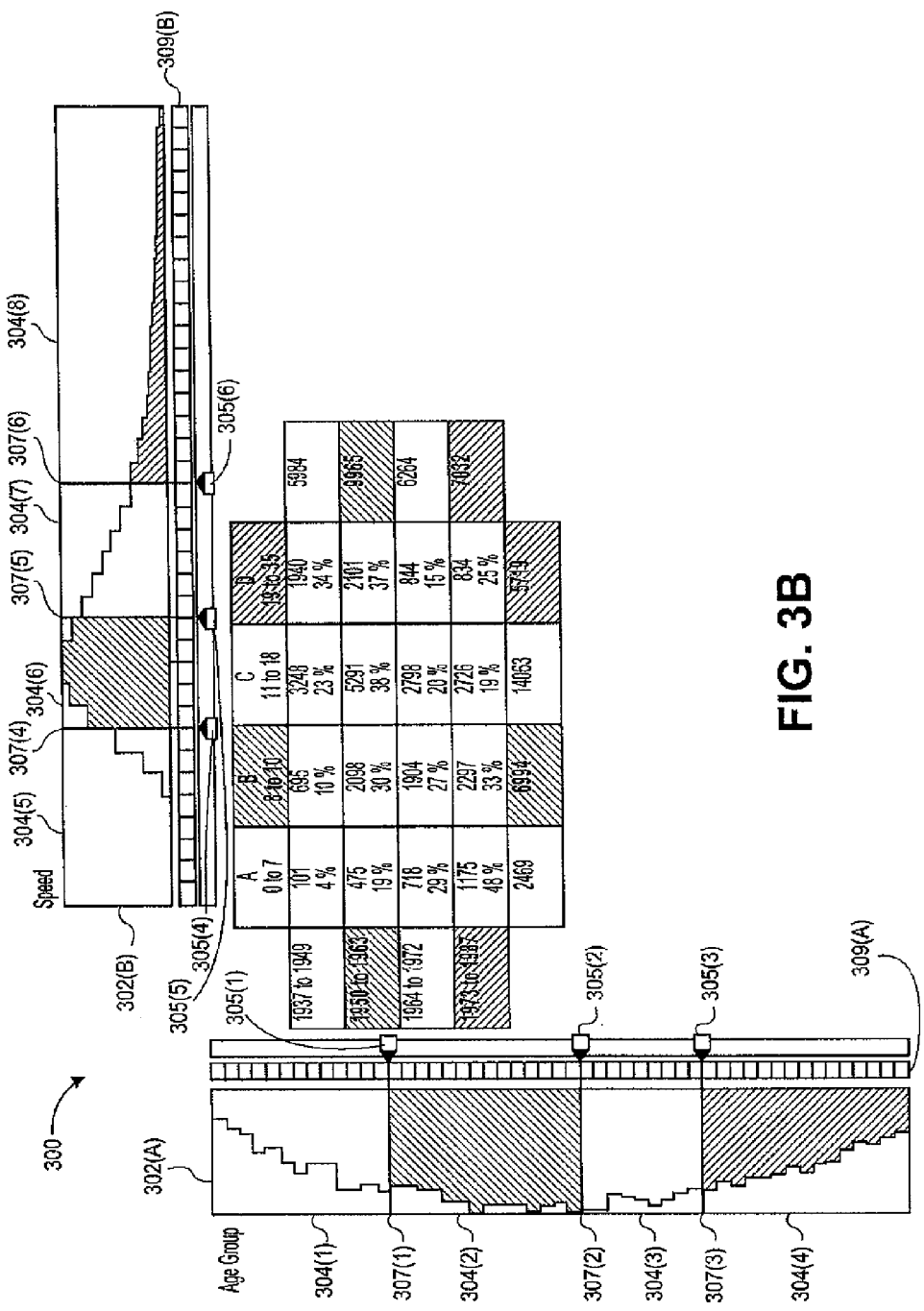
FIG. 3B is an example of the crosstab data form from FIG. 3A after modification of one subjective parameter.
Figure 3C:
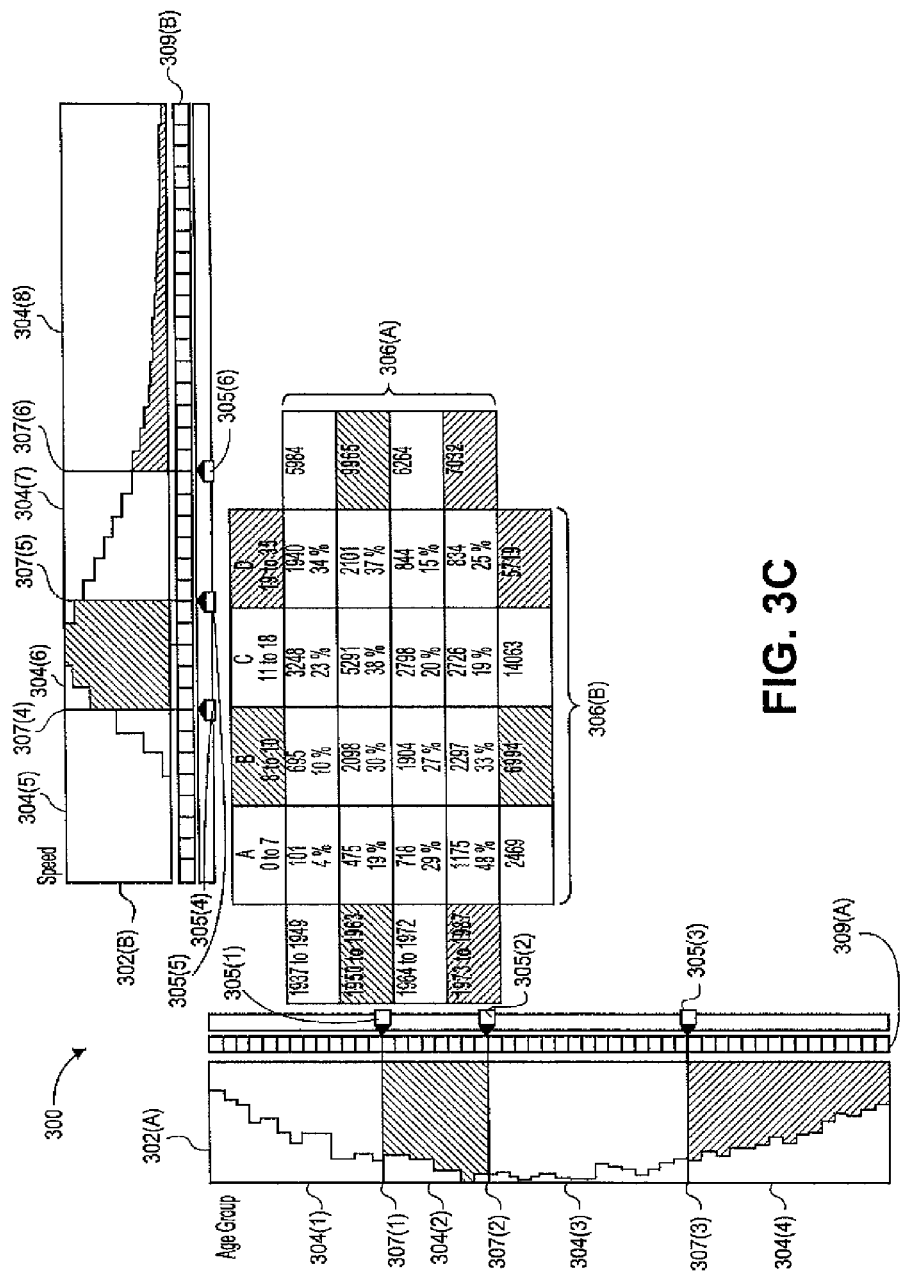
FIG. 3C is an example of the crosstab data form from FIG. 3B after modification of a second subjective parameter.

FIGS. 3A-3C provide an example of a graphical user interface 300 which allows the user to modify subjective parameters associated with a data form as described above in connection with FIG. 2. In this particular example, two numeric band aggregate variables ("Age Group" and "Speed") are represented as histograms over horizontal and vertical axes in a graphical user interface environment 300. As shown, the graphical user interface 300 includes a first histogram element 302(A) and a second histogram element 302(B). The first histogram elements 302(A) is associated with the Age Group aggregate variable, while the second histogram element 302(B) is associated with the Speed aggregate variable. Each of the histograms 302(A) and 302(B) provides a graphical display of tabulated frequencies for its respective aggregate variable.

In this example, the aggregate variables coded into bands 304 in the histograms 302 over the numeric integer values "Year of Birth" and "Completion Time in Minutes". Thus, in the first histogram element 302(A), four bands 304(1)-304(4) are defined by cutoff points 307(1), 307(2) and 307(3) which represent subjective parameters chosen by the user. In this particular example, the histogram element 302(A) also includes a values bar 309 which indicates the available values to which the slider control may be set. In the example shown, each horizontal line in the values bar 309(A) represents an integer value—a year of birth. Thus, in this particular example, if a cutoff point 307 is moved from one line in the values bar 309(A) to the immediately adjacent line, the value associated with the cutoff point changes by value of one.

As with the first histogram element, in the second histogram element 302(B), four bands 304(5)-304(8) are defined by cutoff points 307(4)-307(6). Associated with each of the cutoff points 307(1)-307(3) and 307(4)-307(6) are a slider control elements 305(1)-(3) and 305(4)-(6), respectively. The second histogram element 302(B) also includes a values bar 309(B) which includes vertical lines each representing one minute of time for completion (in accordance with the integer variable being modeled. The slider control elements are positioned on the axis of each histogram element 302, and movement of each control 307 causes its associated cutoff 305 point to be moved as well, thereby modifying the subjective parameters used in the data analysis.

The graphical user environment 300 also includes a data form 306. The data form 306 in the example shown in FIG. 3A is a crosstab form 306 which displays the joint distribution of the subjective parameters defined by the cutoff points 307(1)-307(6). The crosstab form 306 includes a plurality of rows 306(A) and a plurality of columns 306(B). Each row 306(A) includes the distribution of data items based on the cutoff points 307(L)-307(3) which define the bands 304(1)-304(4) in the first histogram element 302(A). Thus, in the example shown, the first row in the cross tab includes the distribution of data in the first age group on the histogram, while the subsequent rows 306(A) in the cross tab 306 each include the data distribution for the subsequent data bands 304(2)-304(4). As noted above, the subjective parameters as defined by the cutoff points 307(1)-307(3) are expressed as the year in which subjects were born. As a result, the first row 306(A) in the data form includes the years 1937-1949 (as indicated by the first band 304(1)), the second row includes the years 1950-1963 (as indicated by the second band 304(2)), the third row includes the years 1964-1972 (as indicated by the third band 304(3)), and the fourth row includes the years 1973-1987 (as indicated by the fourth band 304(4)).

As is apparent from the figure, the number of rows in the crosstab will generally be the same as the number of bands 304 in the associated histogram (absent row headings and totals). Each column 306(B) in the crosstab data table 306 is similarly configured to be indicative of the distribution of data among the hands 304(5)-304(8) in the second histogram element 302(B). In addition, it is to be noted that each band 304 in the histograms 302 may be visually differentiated from neighboring bands by utilizing different colors or shading in order to better illustrate the current cutoff points 305. The crosstab 306 may be similarly color-coded to provide a better visual context in which to view the data analysis presented therein.

As noted previously, each cutoff point 305 is typically associated with a subjective parameter that is being considered in the data analysis process. When any one of the cutoff points 305 is modified, the data form 306 is immediately updated to provide immediate feedback to the user. An example of this process is provided in FIG. 3B. As shown in the figure, the new parameters are sent to the statistical analysis module. As noted above in connection with FIG. 2, the statistical analysis module generates new values for the data form in response to changes in the slider controls 305.

Each of the slider control elements 305 may be moved along its axis in order to adjust the cutoff points 307 for the data analysis. Typically, the slider control is moved using a mouse and a cursor. In these implementations, the user may hover the mouse cursor over the slider 305 and then "drag" the slider by actuating the mouse button and moving the mouse in the desired direction. When the slider control 305 is positioned in the desired location on with respect to the values bar 309, the user may then release the mouse button, and the slider control 305 is then repositioned. In some embodiments, the system is configured to provide an immediate update of the graphical user interface 300 as the slider control element 305 moves along the axis. For example, as a slider control 305 passes a value line in the values bar 309, a request is made to the statistical analysis module for an updated data form based on the new value for that parameter. Thus, as the slider control 305 is moved across several values, the data form may be constantly updated to reflect the data analysis for not only the starting and finishing interval of the slider control, but also for those intermediate points. By providing this immediate and real-time update, the user can more easily visualize progressive changes to the data form 306. Alternatively, the request for an updated data form may be configured to be made only when the slider control 305 has been "released" by the user and the slider control is in its destination location.

FIG. 3B provides an example of a modification of a subjective parameter cutoff point 307 associated with the histogram element 302(B), which represents the aggregate variable Speed by coding the data as bands over numeric integer values by Completion Time (in Minutes). In this example, the slider control 305(5) has been moved horizontally two positions to the right. This movement of the slider control 305(5) causes the its associated cutoff point 307(5) to move away from the cutoff point 307(4) and closer to cutoff point 307(6). More specifically, the slider control 305(5) has been moved to the right two increment values (expressed as Time to Completion, as noted previously). Thus, the handing of the aggregate "Speed" variable is changed. By moving the slider control 305(5) horizontally as shown, the cutoff point 307(5) between the bands 304(6) and 304(7) is changed. As a result, the times to completion included in the bands 304(6) and 304(7) change. The band 304(6) has changed from 8-10 minutes to 8-12 minutes, while the, while the band 304(7) has changed from 11-18 minutes to 13-18 minutes.

As a result of the change in the data banding of the aggregate speed variable, the statistical analysis module has updated the associated columns 306(B) in the crosstab accordingly. For example, the values in the second and third columns in the crosstab now reflect the new data bands 304(6)

and 304(7), with their values updated accordingly, while the first and fourth columns remain unchanged, as their associated slider controls 305(4) and 305(6) and data bands 304(5) and 304(8) have not been modified by the user.

In addition to modifying the data banding associated with the speed aggregate variable, the user interface 300 may be configured to allow user specification of other subjective variables. Turning now to FIG. 3C, an example is provided of the user interface 300 being further modified by adjusting cutoff points with respect to the Age Group aggregate variable represented in histogram element 302(A). In the example provided in FIG. 3C, the slider control 305(2) has been adjusted to move the cutoff point 307(B) away from the cutoff point 307(3) and closer to cutoff point 307(1). More specifically, the slider control 305(2) has been moved upwards five intervals (expressed as year of birth, as noted previously). Thus, the banding of the aggregate "Age Group" variable is changed. By moving the slider control 305(2) vertically as shown, the cutoff point 307(2) between the bands 304(2) and 304(3) is changed. As a result, the years of birth included in the bands 304(2) and 304(3) change. The band 304(2) has changed from 1950-1963 to 1950-1957, while the band 304(3) has changed from 1964-1972 to 1958-1972.

As a result of the change in the data banding of the aggregate variable, the statistical analysis module has updated the crosstab 306 elements accordingly. For example, the values in the second and third rows in the crosstab now reflect the new data bands 304(2) and 304(3), with their values updated accordingly, while the first and four rows remain unchanged, as their associated slider controls 305(1) and 305(3) and data bands 304(1) and 304(4) have not been modified by the user.

Figure 4B:
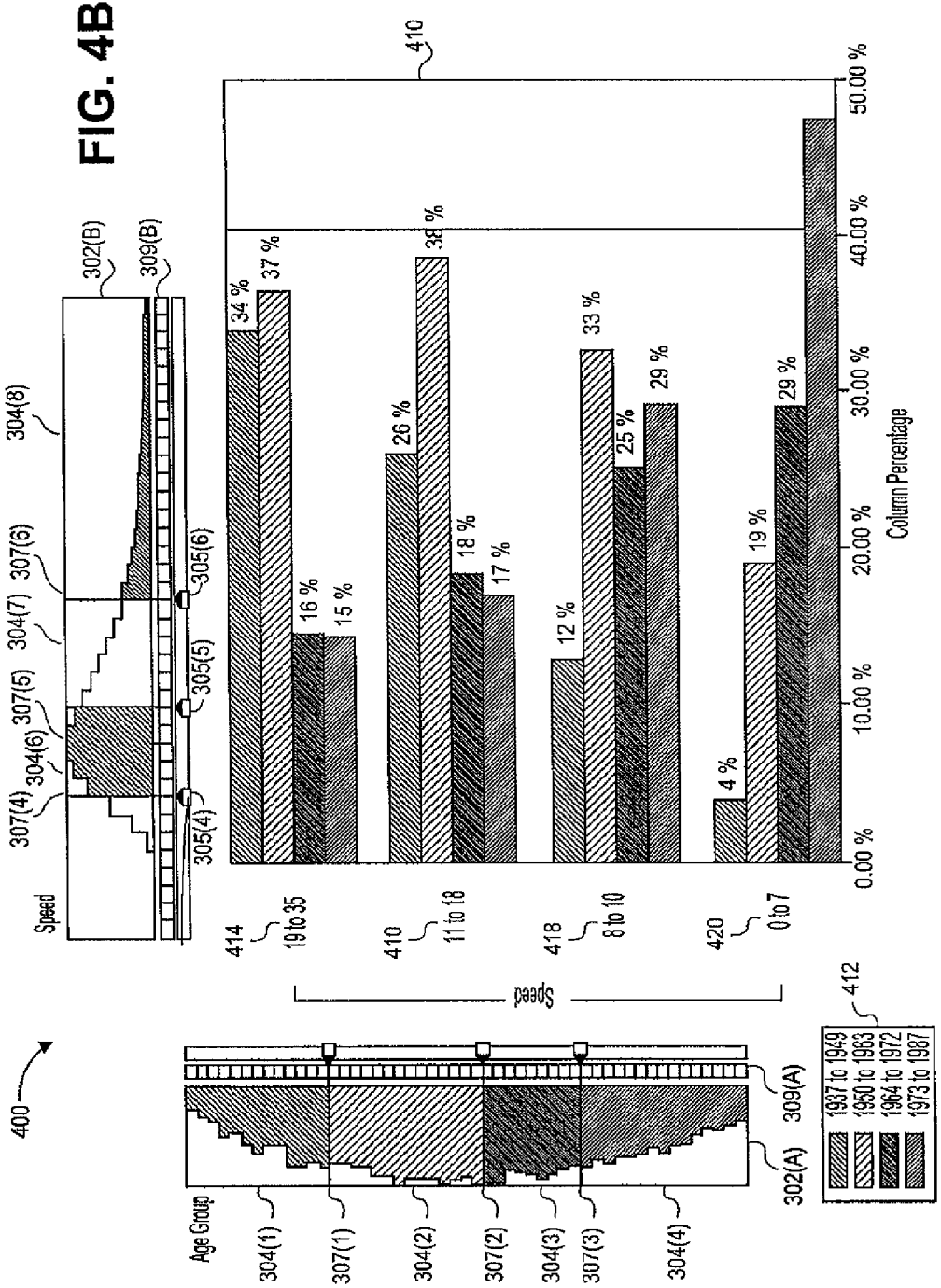
FIG. 4B is an example of the bar chart data form from FIG. 4A after modification of one subjective data parameter.

In some embodiments, different types of data forms may be used to present the statistical data to the user. FIGS. 4A-4C provide an illustration of an embodiment in which a bar chart data form with provided with interactive and modifiable numeric banding. Referring specifically to FIG. 4A, a graphical user interface 400 is provided that includes histograms elements 302(A) and 302(B) that are similar to those shown in FIG. 3 and discussed above. In this instance the data form is a bar chart 410 in which the cutoff points 307 are provided as values in the bar chart 410. In order to assist the user in understanding the data provided in the bar chart 410, a coding map 412 is provided which illustrates how the subjective variables are represented in the chart 410.

In this particular example, the bar chart presents the data by presenting each speed range and the percentage breakdown by age of persons whose speed score falls within the defined range. Thus, taking the first set of bars 414 in the bar chart 410 as an example, the data is interpreted to mean that of the persons whose speed falls within the 19-35 minutes to completion range, 34 percent are in the 1937-1949 age group, 37 percent are in the 1950-1963 age group, 16 percent are in the 1964-1972 age group, and 15 percent are in the 1973-1987 age group. Similar interpretations of data may be derived from the other bar groupings 416, 418, and 420 shown in the figure.

As with the previous example, when the user adjusts any of the slider control elements 305, the bands 307 which represent subjective parameters based on the aggregate variables are adjusted accordingly. FIG. 4B provides an illustration of how the chart may be modified when the slider control 305(5) is moved two integer intervals to the right in a manner similar to that described above in connection with FIG. 3B. As noted previously, this movement of the slider control 305(5) results in the modification of the cutoff point 307(5) and a change in the data bands 304(6) and 304(7). This slider control movement generates a system call to the statistical analysis module which performs an updated analysis of the data based on the newly defined subjective parameters. When the updated analysis is returned to the user interface, various changes are apparent as shown in FIG. 4B. The two groups of bars 416 and 418 positioned in the middle of the bar chart 410 have been updated to reflect the new subjective parameters specified by the user. More specifically, the speed range for the second group of bars 416 has changed from 11-18 to 13-18. As a result, the bars representing the percentage values within the respective age groups have also changed. Similarly, the speed range specified in the third group of bars 418 in the bar chart 410 has also been modified from 8-10 to 8-12, in order to reflect the change in the data bands 304 in the histogram element 302(B).

While FIG. 4B provides an example of modifying the data banding associated with the speed aggregate variable, the user interface 400 may be further configured to allow user specification of additional subjective variables such as the age group intervals shown in the histogram element 302(A). FIG. 4C provides an illustration of how the user interface 400 is modified when the user adjusts a slider control 305(2) on the histogram element 302(A) by moving the slider control 305(2) upward five intervals (in the same manner as described above in connection with FIG. 3C). As noted previously, moving the slider control 305(2) results in a change in the banding of the aggregate "Age Group" variable because the cutoff point 307(2) between the bands 304(2) and 304(3) is changed. As a result, the years of birth included in the bands 304(2) and 304(3) change. The band 304(2) has changed from 1950-1963 to 1950-1957, while the band 304(3) has changed from 1964-1972 to 1958-1972. In response to the change in the data bands 304(2) and 304(3), the statistical analysis module re-analyzes the data using the new parameters and returns a new data form 306 for display within the user interface 400 as shown. It is to be noted that the middle two bars in each of the respective groups of bars 414, 416, 418, and 420 are changed due to changes made to the subjective parameters. Further the birth year intervals shown in coding map 412 are also changed to reflect the adjusted data bands 304(2) and 304(3).

Figure 5:
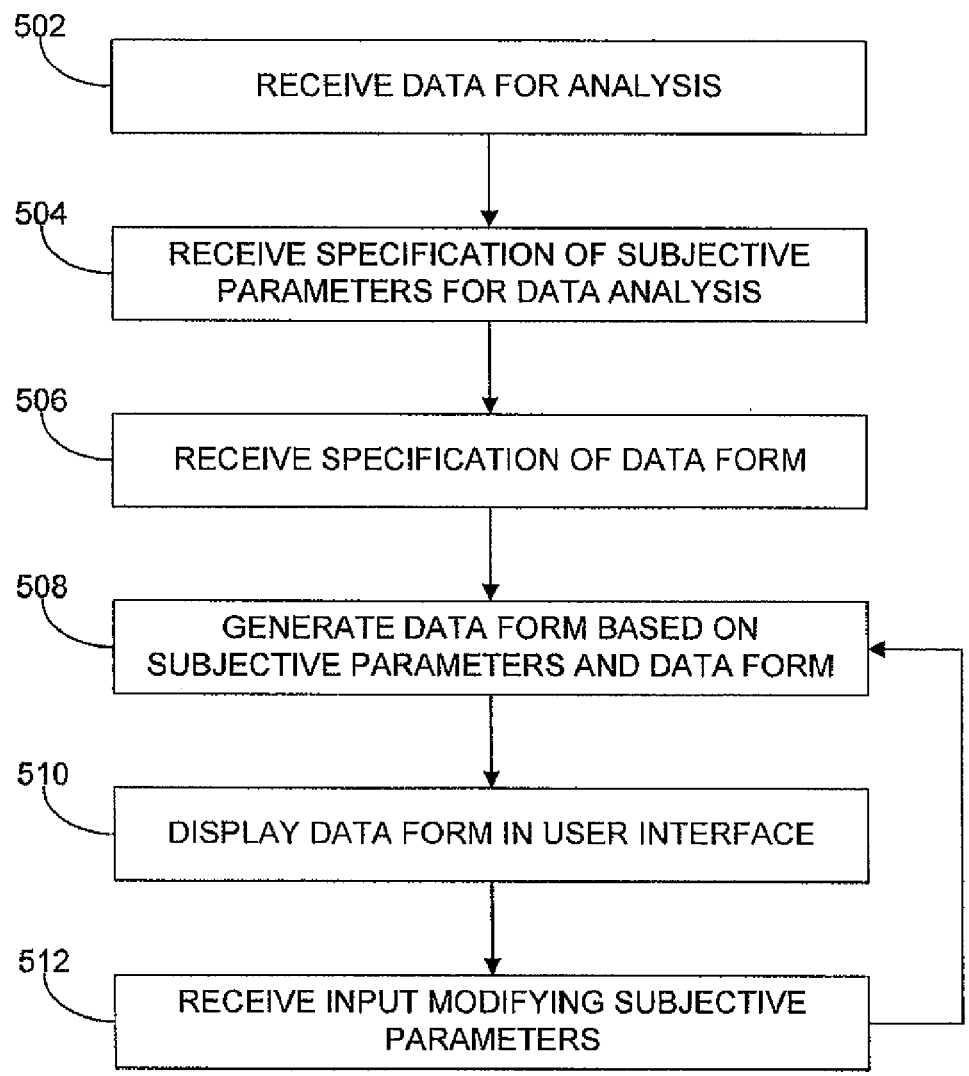
FIG. 5 is a flowchart of a method of providing interactive data analysis.

Utilizing the user interfaces described above, a user is able to easily test various scenarios and hypotheses on collected data by adjusting subjective parameters as desired. FIG. 5 is a flowchart which describes a process by which data analysis is performed in accordance with one or more embodiments described herein. The process begins at block 502 where the data is collected into data storage 104 which may be used for data analysis. Next, the process moves to block 504, where the system receives a specification of subjective parameters for the data analysis. In some embodiments, these parameters may be predefined and entered with the data. Alternatively, the user may specify the subjective parameters utilizing the data form display module 108. The process then moves to block 506, where the system receives the specification of the data form to utilize in presenting data in the data form display module 108. As with the subjective parameters, these data form may be user specified, or it may be determined by the statistical analysis module 106. Next, at block 508, a data form is generated based on the subjective parameters and the data form selected. As noted previously, the statistical analysis module 106 is typically configured to perform this operation. Once the data form has been generated, the data form is then displayed to the user at bock 510. The display of the data form may be coordinated, processed, and/or handled by the data form display module 108 and may generate a user interface such as that described in FIGS. 3 and 4 above. Once the data form has been displayed to the user, the user may then modify the subjective parameters at block 512. As discussed above, the user may modify the subjective parameters by adjusting the slider controls 305 which in turn moves the cutoff points 307 and results in a change in the data bands 304. When the modified subjective parameters are received, the process then returns to block 508, where the data form 306 is regenerated based on the new subjective parameters. The process in blocks 508, 510, and 512 may be repeated in order to allow the user to test various different scenarios.

In view of the above, one will recognize that the disclosed embodiments provide a data analysis environment that allows researchers to visually and interactively modify subject data analysis parameters to allow researchers to easily test and evaluate different scenarios without requiring additional data analysis steps on the part of the user.

Those of skill will recognize that the user interface and various functions described herein may be embodied in one or more executable software modules that may be stored on any type of computer storage medium or system, and that some or all of the functions may alternatively be embodied in application-specific circuitry. The various illustrative logical blocks, modules, and algorithm steps described in connection with the embodiments disclosed herein may be implemented as electronic hardware, computer software, or combinations of both.

While the above detailed description has shown, described, and pointed out novel features of the invention as applied to various embodiments, it will be understood that various omissions, substitutions, and changes in the form and details may be made by those skilled in the art without departing from the spirit of the invention. As will be recognized, some embodiments of the present invention may not provide all of the features and benefits set forth herein, and some features may be used or practiced separately from others. The scope of the invention is indicated by the appended claims rather than by the foregoing description. All changes which come within the meaning and range of equivalency of the claims are to be embraced within their scope.

What is claimed is:

1. An interactive data analysis system comprising:
   a computer, and a memory storing instructions executable by the computer, the instructions configured to generate a user interface on a display, wherein the user interface includes:
   a first histogram element indicative of collected data regarding a first aggregate variable, the first histogram element having a plurality of data band controls configured to control adjustment of a plurality of data bands presented in the first histogram element, wherein the plurality of data bands are indicative of a first plurality of subjective parameter values associated with the first aggregate variable;
   a second histogram element indicative of collected data regarding a second aggregate variable, the second histogram element having a plurality of data band controls configured to control adjustment of a plurality of data bands presented in the second histogram element, wherein the plurality of data bands are indicative of a second plurality of subject parameter values associated with the second aggregate variable; and
   a dynamic data form element separate from the first histogram element and the second histogram element, the dynamic data form element comprising graphical information indicative of the joint distribution of the subjective parameter values of the first aggregate variable and the second aggregate variable, based on the location of the plurality of data bands in the first histogram element and the location of the plurality of data bands in the second histogram element, wherein the graphical information updates in real-time based on changes in one or more of the data bands.

2. The interactive data analysis system of claim 1, wherein each of the data bands presented in the first histogram element is indicative of a range associated with the first plurality of subjective parameter values, and wherein each of the data bands presented in the second histogram element is indicative of a range associated with the second plurality of subjective parameter values.

3. The interactive data analysis system of claim 1, wherein the data band controls comprise slider controls.

4. The interactive data analysis system of claim 3, wherein the slider controls are each associated with a cutoff point in the histogram elements, and wherein the cutoff point comprises a boundary between two of the plurality of data bands.

5. The interactive data analysis system of claim 4, wherein one or more of the histogram elements further includes a values bar indicative of cutoff point intervals at which the slider controls may be set.

6. The interactive data analysis system of claim 1, wherein the dynamic data form element comprises a visual display element indicative of all of the collected data regarding the first aggregate variable and the second aggregate variable, and wherein the dynamic data form element is automatically modified based on changes in the data banding of the first and second aggregate variable.

7. The interactive data analysis system of claim 6, wherein the data form comprises a crosstab form.

8. The interactive data analysis system of claim 6, wherein the data form comprises a bar chart.

9. The interactive data analysis system of claim 1, wherein data bands presented in the first histogram element are color-code substantially similarly to corresponding data in the dynamic data form element.

10. A computer-implemented method of providing an interactive data analysis interface on a display associated with a computing device, the method comprising:
    providing instructions which allow the display to display a first histogram element indicative of collected data regarding a first aggregate variable, a second histogram element indicative of collected data regarding a second aggregate variable, and a data form in a user interface; wherein the data form comprises a visual display element indicative of a joint distribution of a first plurality of subjective parameters associated with the first aggregate variable and second plurality of subjective parameters associated with the second aggregate variable;
    receiving a user input with respect to at least one of the first and second histogram elements;
    in response to the input, modifying at least one of the first plurality of subjective parameters associated with the first aggregate variable and the second plurality of subjective parameters associated with the second aggregate variable;
    transmitting the modified subjective parameter to a statistical analysis module for generation of a new data form; and
    displaying the new data form in the user interface.

11. The method of claim 10, wherein the first histogram element comprises a plurality of data bands indicative of the first plurality of subjective parameter values and a plurality of controls configured to permit adjustment of the data bands, and wherein the second histogram element comprises a plurality of data bands indicative of the second plurality of subjective parameter values and a plurality of controls configured to permit adjustment of the data bands.

12. The method of claim 11, wherein the controls comprise slider controls.

13. The method of claim 12, wherein the slider controls are each associated with a cutoff point, and wherein the cutoff point comprises a boundary between two of the plurality of data bands.

14. The method of claim 13, wherein one or more of the histogram elements further includes a values bar indicative of cutoff point intervals at which the slider controls may be set.

15. The method of claim 10, wherein the new data form comprises a visual display element indicative of the joint distribution of the first plurality of subjective parameters associated with the first aggregate variable and the second plurality of subjective parameters associated with the second aggregate variable, wherein the first and second aggregate variables comprise a set of collected values, and wherein the visual display element is further indicative of the entire set of collected values.

16. The method of claim 10, wherein the data form comprises a crosstab form.

17. The method of claim 10, wherein the data form comprises a bar chart.

18. The method of claim 10, further comprising color-coding data bands in the histogram similarly to corresponding data in the data form.

19. A computer system programmed to perform the method of claim 10.

* * * * *